(12) United States Patent
Langenfeld

(10) Patent No.: US 6,675,696 B1
(45) Date of Patent: Jan. 13, 2004

(54) PUMP AND CENTER SECTION FOR HYDROSTATIC TRANSMISSION

(75) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 102 days.

(21) Appl. No.: 10/022,323

(22) Filed: Dec. 14, 2001

(51) Int. Cl.[7] ............................................. F16D 31/02
(52) U.S. Cl. ........................... 91/485; 91/499; 60/487
(58) Field of Search ................... 60/484, 487; 91/503, 91/504, 485–499; 92/71; 417/269; 180/242, 307

(56) References Cited

U.S. PATENT DOCUMENTS

| | | | | |
|---|---|---|---|---|
| 3,131,605 A | * | 5/1964 | Borde ........................ | 91/485 |
| 3,170,297 A | * | 2/1965 | Larson ....................... | 91/485 |
| 3,585,901 A | * | 6/1971 | Moon et al. ................. | 91/499 |
| 3,604,314 A | * | 9/1971 | Steiner ....................... | 91/485 |
| 3,641,765 A |   | 2/1972 | Hancock et al. | |
| 3,807,283 A | * | 4/1974 | Alderson et al. ............ | 91/499 |
| 3,975,990 A | * | 8/1976 | Kraus ......................... | 92/71 |
| 5,230,274 A | * | 7/1993 | Yu et al. ..................... | 91/499 |
| 5,314,387 A |   | 5/1994 | Hauser et al. | |
| 6,322,474 B1 |   | 11/2001 | Hauser | |
| 6,336,391 B1 | * | 1/2002 | Alm et al. ................... | 92/71 |

* cited by examiner

Primary Examiner—Edward K. Look
Assistant Examiner—Igor Kershteyn
(74) Attorney, Agent, or Firm—Neal, Garber & Eisenberg, LLP

(57) ABSTRACT

A hydraulic transmission having a hydraulic pump, a hydraulic motor and a center section having a pump running surface on which the hydraulic pump rotates and a motor running surface of which the hydraulic motor rotates. The center section has porting by which the hydraulic pump and the hydraulic motor are in fluid communication wherein the porting terminates in a pair of equidistantly spaced, generally arcuate shaped openings. The pump running surface includes a plurality of generally v-shaped grooves extending from each of the ends of the generally arcuate shaped openings.

30 Claims, 8 Drawing Sheets

PUMP AND CENTER SECTION FOR HYDROSTATIC TRANSMISSION

BACKGROUND OF THE INVENTION

This invention relates generally to hydrostatic transmissions and, more particularly, relates to a novel pump and center section for use in hydrostatic transmissions.

Hydrostatic transmissions ("HSTs") including integrated hydrostatic transmissions ("IHTs") are well known in the art and are more fully described in, among others, U.S. Pat. No. 5,314,387, which is incorporated herein by reference in its entirety. Generally, an HST includes a center section on which is mounted a hydraulic pump and a hydraulic motor. The hydraulic pump and the hydraulic motor each carry a plurality of reciprocating pistons which are in fluid communication through pumping and intake porting formed in the center section. Rotation of the hydraulic pump by an engine creates an axial motion of the pump pistons against a swash plate which forces a hydraulic fluid through the pumping porting to the hydraulic motor which moves the motor pistons in an axial direction. The axial movement of the motor pistons causes the hydraulic motor to rotate as the motor pistons bear against a thrust bearing. As the hydraulic motor rotates, the hydraulic fluid is returned to the hydraulic pump through the intake porting. In this manner, the rotation of the hydraulic pump is translated to the hydraulic motor which is then used to drive vehicle axles of a riding lawn mower, small tractor and the like.

For use in providing smoother and quieter movement of the hydraulic pump as it rotates on the center section, it is known to provide grooves in the lands of the center section at the ends of the port openings. More specifically, the purpose of the grooves is to smooth and quiet the movement of the hydraulic fluid as the pump cylinder block piston port openings move relative to the center section port openings. A typical groove having a generally uniform groove width may be seen in FIG. 17 of U.S. Pat. No. 6,322,474, which is incorporated herein by reference in its entirety. This typical groove design, however, has not been found to provide sufficient smoothness and quietness when used in connection with the operation of a 10 cubic centimeter ("cc") per revolution, seven-piston hydraulic pump.

A further exemplary groove having a "V" shape which is formed in a porting plate can be seen in FIGS. 3 and 4 of U.S. Pat. No. 3,641,765. While the '765 patent describes the "V" shaped groove as having at its deepest point a depth of the order of one-seventh of the thickness of a porting plate, the '765 patent fails to provide a concrete solution with respect to the problem of how to provide a 10 cc per revolution, seven-piston hydraulic pump and center section combination with a smoother and quieter mode of operation. Rather, the '765 patent ambiguously states that an "optimum groove configuration can best be found by trail and error for any given design of pump, choice of working pressure, etc."

SUMMARY OF THE INVENTION

To solve the problems associated with providing smooth and quiet operation of a hydraulic pump and center section combination and, more particularly, a 10 cc per revolution, seven-piston hydraulic pump, a center section having an improved groove design is described. Generally, the center section has porting by which the hydraulic pump and the hydraulic motor are in fluid communication wherein the porting terminates in a pair of equidistantly spaced, generally arcuate shaped openings and the pump running surface includes a plurality of generally v-shaped grooves extending from each of the ends of the generally arcuate shaped openings. Each of the grooves has side walls that taper inwardly and terminate at a generally arcuate shaped bottom. The groove bottom has a first portion adjacent to the ends of the arcuate openings that is generally parallel to the pump running surface and a second portion that is angled and which extends from the first portion to the pump running surface. The side walls each have a straight portion along their length between a tapered portion, which provides the groove with the general v-shape, and the end of the arcuate opening.

The described center section is particularly suited for use in connection with a 10 cc per revolution, seven-piston pump having a pitch diameter of approximately 1.52 inches. A preferred embodiment further provides each of the piston cylinders with a height of approximately 1.2 inches. Therefore, to ensure proper engagement with a thrust bearing of a moveable swash plate, the pistons have a nose portion having a radius of approximately 0.3 inches with an external diameter of approximately 0.53 inches.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
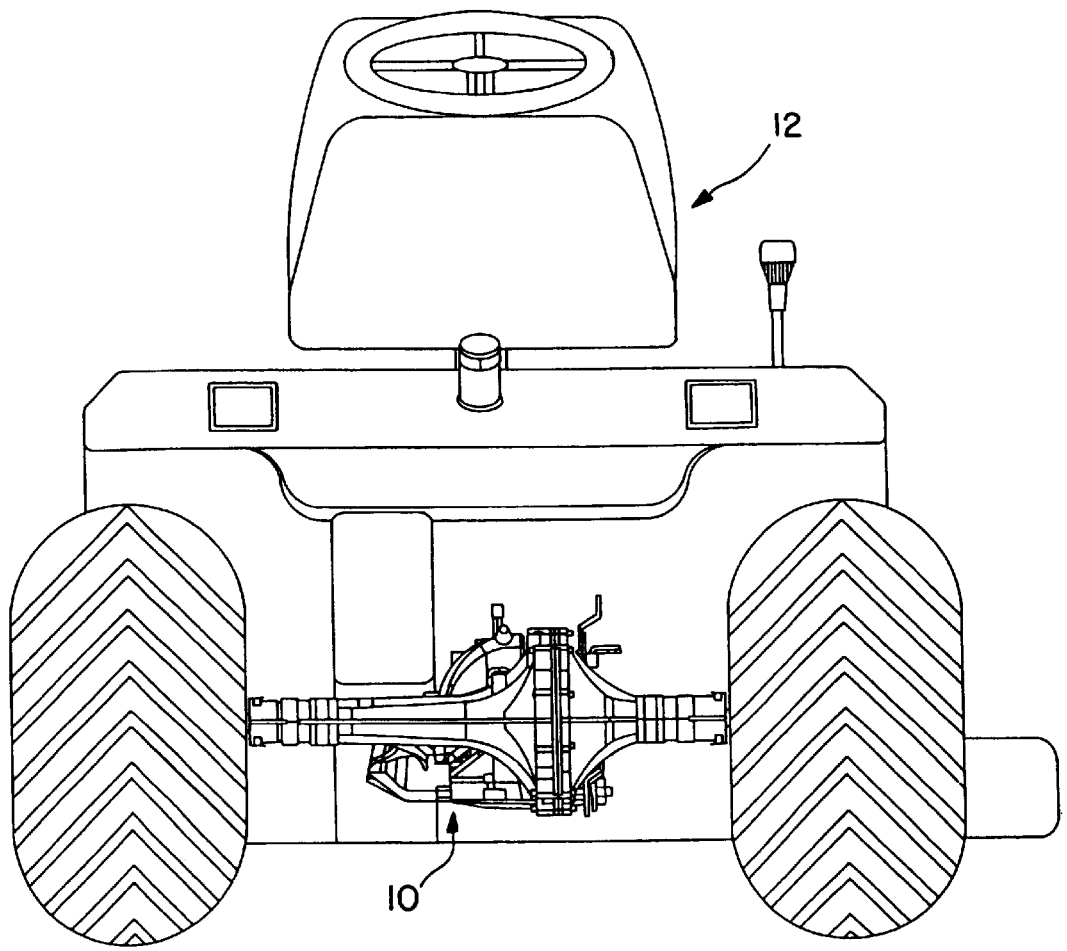
FIG. 1 illustrates a rear view of a tractor using an exemplary transmission constructed in accordance with the subject invention.
Figure 2:
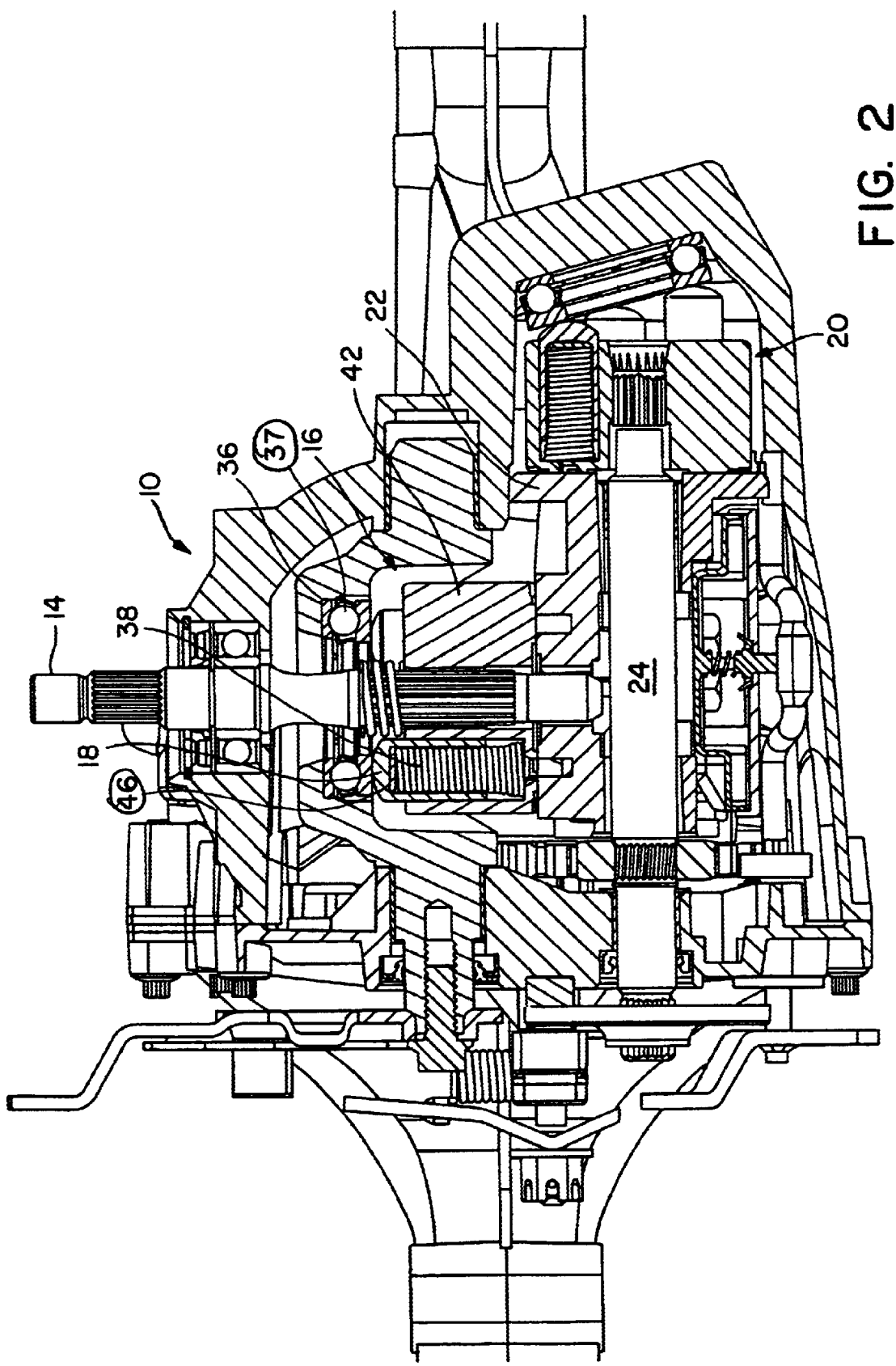
FIG. 2 illustrates a cross-sectional front view of the transmission illustrated in FIG. 1.
Figure 3:
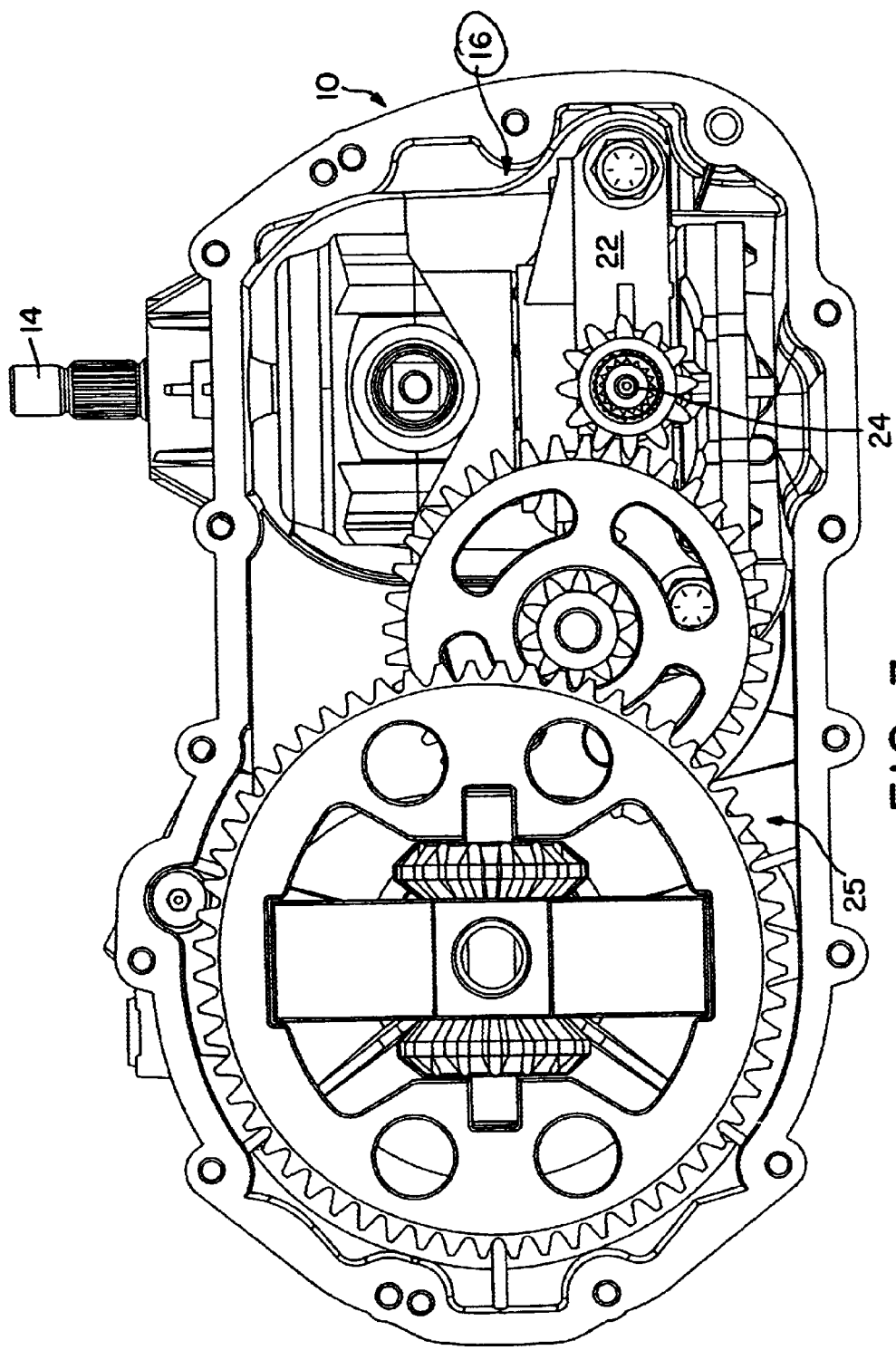
FIG. 3 illustrates a side view of the transmission illustrated in FIG. 1 with a portion of the casing removed.
Figure 4:
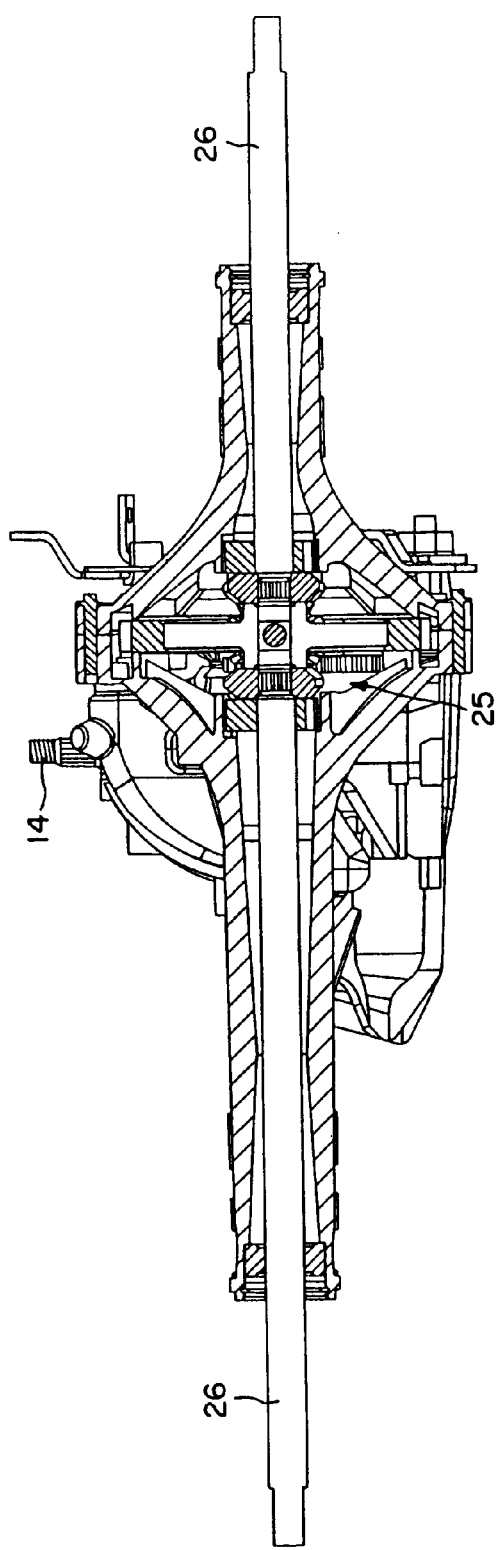
FIG. 4 illustrates a cross-sectional back view of the transmission illustrated in FIG. 1.

Turning now to the figures, wherein like reference numerals refer to like elements, there is generally illustrated in FIG. 1 an axle driving apparatus in the form of a hydrostatic transmission ("HST") 10 for use in connection with a vehicle 12, such as a tractor or the like. While described in the context of an HST, the principles discussed hereinafter may equally be used in a stand-alone pump. As shown in FIGS. 2–4, the illustrated HST 10 operates on the principle of an input shaft 14 rotatably driving a hydraulic pump 16 which, through the action of its pump pistons 18 (only two of which are shown), pushes hydraulic fluid to a hydraulic motor 20 through a center section 22 to cause the rotation of the hydraulic motor 20. The rotation of the hydraulic motor 20 causes the rotation of a motor shaft 24 which rotation is eventually transferred through a gearing system or the like 25 to drive one or a pair of axle shafts 26. A motive force may be supplied directly to the input shaft 14 or indirectly by means of pulleys and belts which are connected to an internal combustion engine. For a more detailed description of the principles of operation of such an HST 10, the reader is referred to U.S. Pat. Nos. 5,201,692 and 6,322,474, which are incorporated herein by reference in their entirety.

Figure 5:
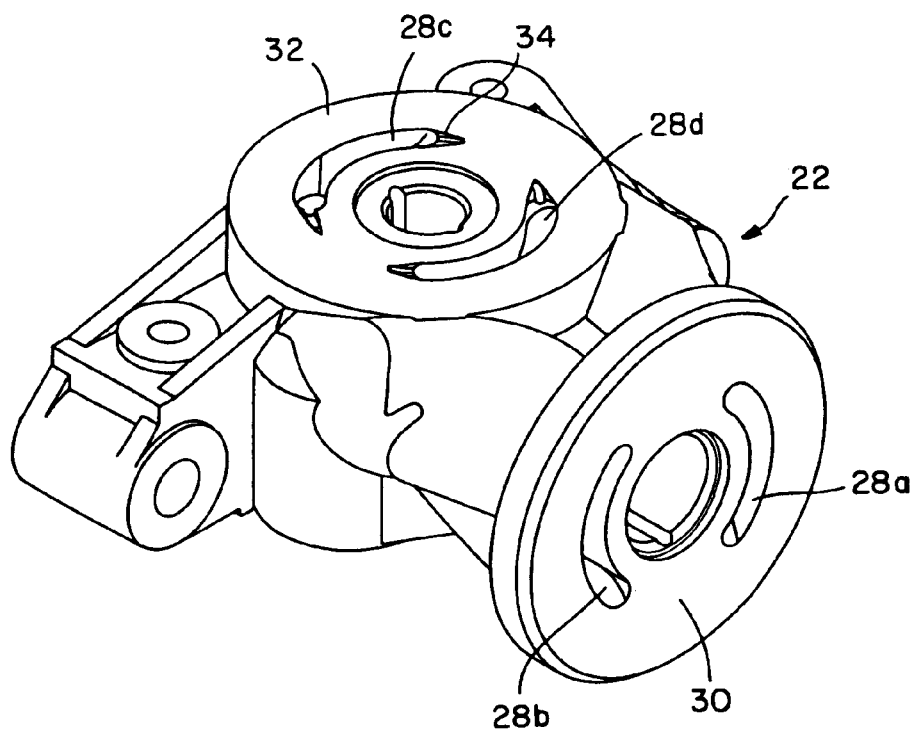
FIG. 5 illustrates an isometric view of an exemplary center section of the transmission illustrated in FIG. 1.

For placing the hydraulic pump 16 in fluid communication with the hydraulic motor 20, the center section 22 includes hydraulic porting which comprises a part of a hydraulic circuit. In this regard, the hydraulic circuit includes two sides, namely, a high pressure side in which hydraulic fluid is being pumped from the hydraulic pump 16 to the hydraulic motor 20 and a low pressure or vacuum side in which hydraulic fluid is being returned from the hydraulic motor 20 to the hydraulic pump 16. More specifically, as illustrated in FIG. 5, one side of the hydraulic circuit includes arcuate or kidney-shaped port opening 28a formed on the motor running surface 30 of the center section 22 which is in fluid communication with arcuate or kidney-shaped port opening 28c formed on the pump running surface 32 of the center section 22. The other side of the hydraulic circuit includes arcuate or kidney-shaped port opening 28b formed on the motor running surface 30 of the center section 22 which is in fluid communication with arcuate or kidney-shaped port opening 28d formed on the pump running surface 32 of the center section 22. Since the hydraulic pump and hydraulic motor system is fully reversible in a standard HST, each pair of port openings 28a/28c and 28b/28d can correspond to either a high pressure side or a low pressure side of the hydraulic circuit. A further description of the hydraulic circuit may be seen in U.S. Pat. No. 6,145,312, which is incorporated herein by reference in its entirety.

Figure 6:
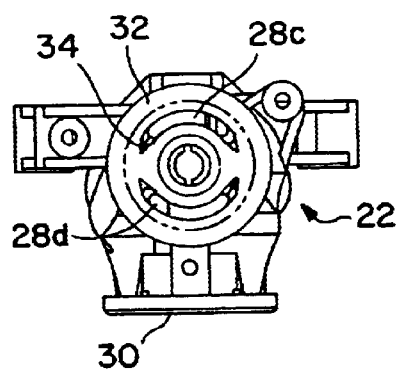
FIG. 6 illustrates a top view of the center section illustrated in FIG. 5.
Figure 7:
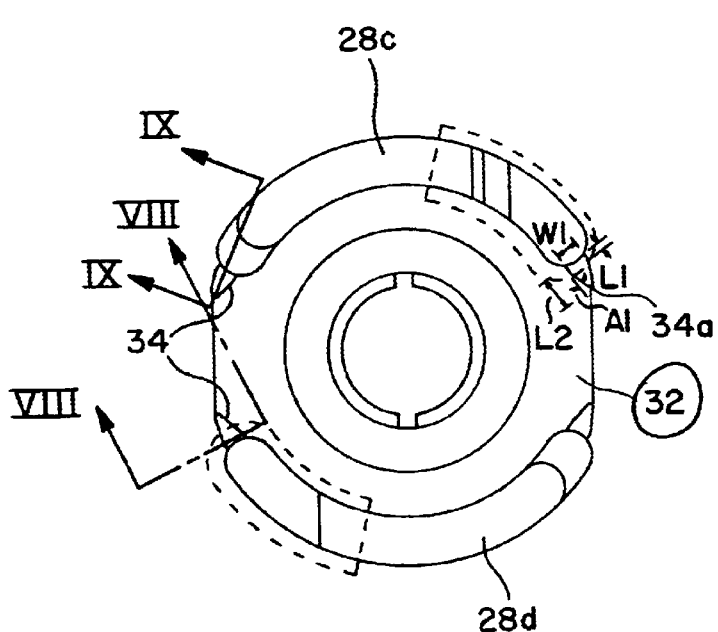
FIG. 7 illustrates an enlarged view of a ports of the center section illustrated in FIG. 6.

For minimizing noise and vibration as the piston port openings 52 in the pump cylinder block 42 transition between the port openings 28c/28d during movement of the pump cylinder block 42 on the pump running surface 32, the pump running surface 32 is provided with grooves 34 that extend from the ends of the equally spaced port openings 28c/28d. Providing grooves 34 at both ends of the port openings 28c/28d is preferred since the hydraulic pump/hydraulic motor combination is typically fully reversible and, therefore, the port openings 28c and 28d can each be included in either the high pressure side or the low pressure side of the hydraulic circuit depending upon the direction of rotation of the hydraulic pump 16 and/or the angle of the swashplate. When used in connection with a 10 cc per revolution hydraulic pump 16 having seven pump pistons 18 and, accordingly seven pump piston port openings 52, the grooves 34 are optimally provided with a generally "V-shaped" configuration when viewed from above as seen in FIGS. 6, 7 and 9.

More specifically, the grooves 34 are preferably provided with a width WI adjacent the end of the port openings 28c/28d that is approximately 0.09 inches. The groove 34 then maintains this width W1 for a length L1 of approximately 0.016 inches whereafter the width tapers at an angle A1 of approximately 14 degrees. The width continues to taper in this manner until the groove terminates in a generally arcuate end 34a. The arcuate end 34a has an approximate radius of 0.16 inches and the resulting overall arc-length L2 of the groove 34 is approximately 0.163 inches. This overall arc-length L2 is approximately 9.5% of the overall arc-length of the port openings 28C/28d and 24.5% of the overall arc-length of the land, i.e., the distance between the ends of the port openings 28c and 28d. In the described embodiment, the arc-angle of the port openings 28c/28d is approximately 130 degrees and, therefore, the arc-angle of each of the lands is approximately 50 degrees.

Figure 8:
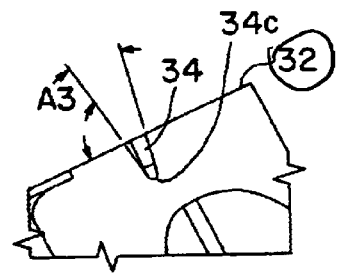
FIG. 8 illustrates a cross-section view of the center section taken along lines VIII—VIII of FIG. 7.
Figure 9:
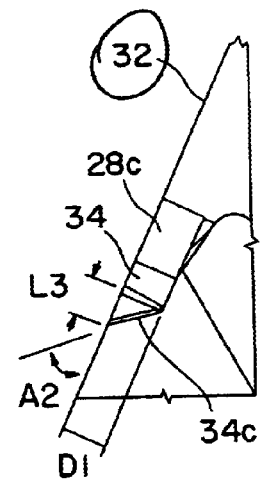
FIG. 9 illustrates a cross-sectional view of the center section taken along lines IX—IX of FIG. 7.

When the groove 34 is viewed from the side, as illustrated in FIG. 9, the tip of the arcuate end 34a of the groove 34 terminates at the level of the pump running surface 32. From this tip, the bottom 34c of the groove 34 extends downwardly at an angle A2 of approximately 55 degrees over a length L3 of approximately 0.149 inches whereupon the bottom 34c extends generally parallel to the pump running surface at a depth D1 of approximately 0.18 inches until the groove 34 joins the port opening 28c or 28d. The sides of the groove 34, best seen in FIG. 8, are angled to provide the groove 34 with a generally V-shaped cross-section having an angle A3 of approximately 20 degrees. The sides terminate at the bottom 34c which is generally arcuate having a radius of approximately 0.016 inches.

For forcing the hydraulic fluid from the hydraulic pump 16 through the hydraulic circuit to the hydraulic motor 20, the hydraulic pump 16 preferably includes seven reciprocating pump pistons 18 that engage a moveable swash plate 36, illustrated in FIG. 2, as the hydraulic pump 16 is rotated by the input shaft 14. The reciprocation of the pump pistons 18 generally results from contact with a thrust bearing 37 carried by the swash plate 36 and the restoring action of a spring 38 that is carried within the pump piston 18. A washer 46 may be placed in the top of the pump piston 18 to prevent damage to the pump piston 18 by the spring 38.

Figure 11:
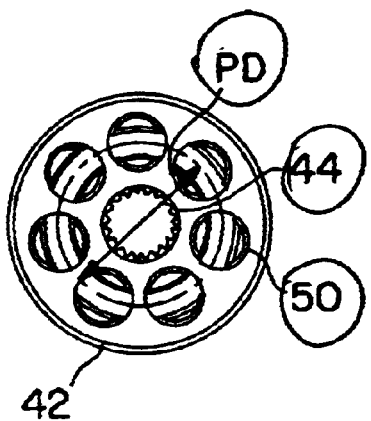
FIG. 11 illustrates a top view of an exemplary pump piston cylinder block of the transmission illustrated in FIG. 1.
Figure 13:
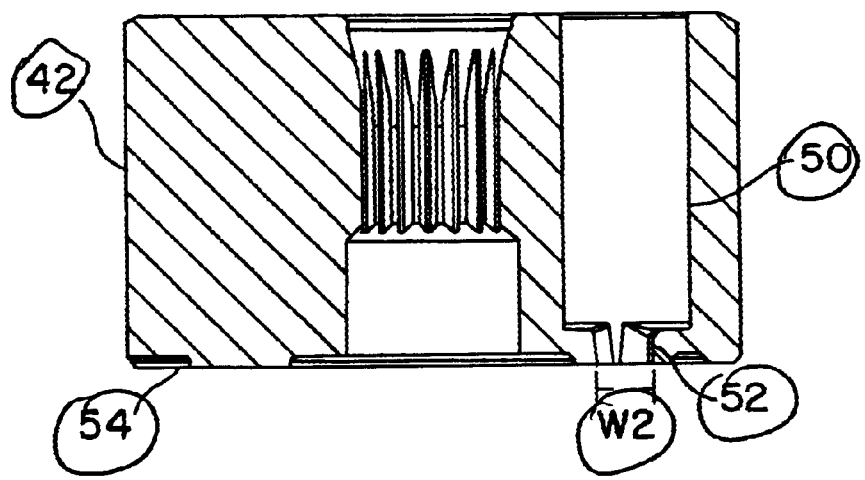
FIG. 13 illustrates a cross-sectional side view of the exemplary pump piston cylinder block taken along line XIII—XIII of FIG. 12.
Figure 12:
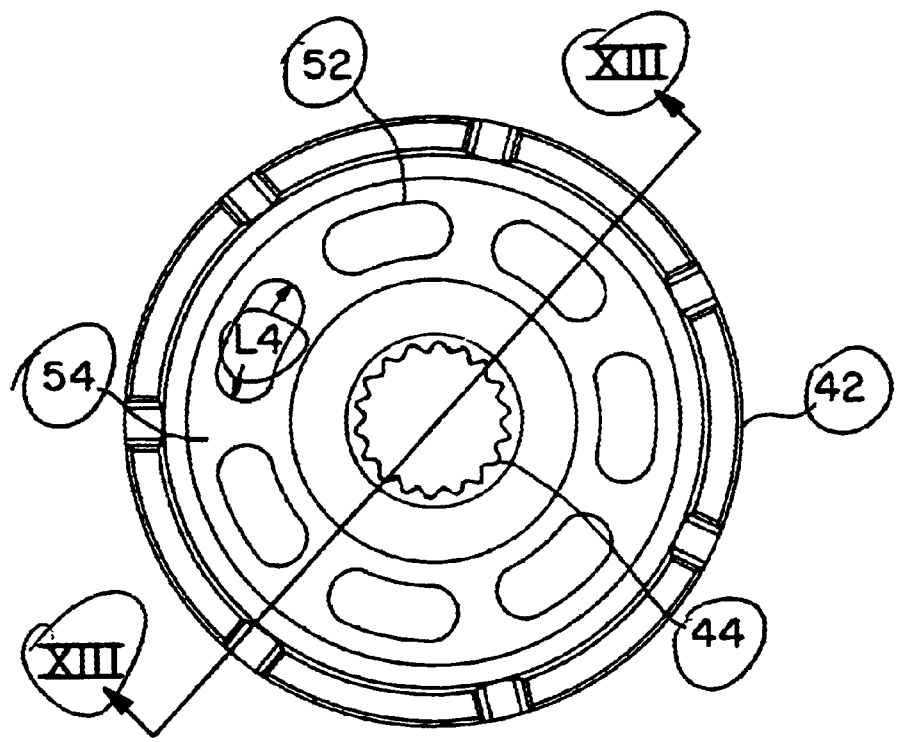
FIG. 12 illustrates a bottom view of the exemplary pump piston cylinder block of FIG. 11.
Figure 1:
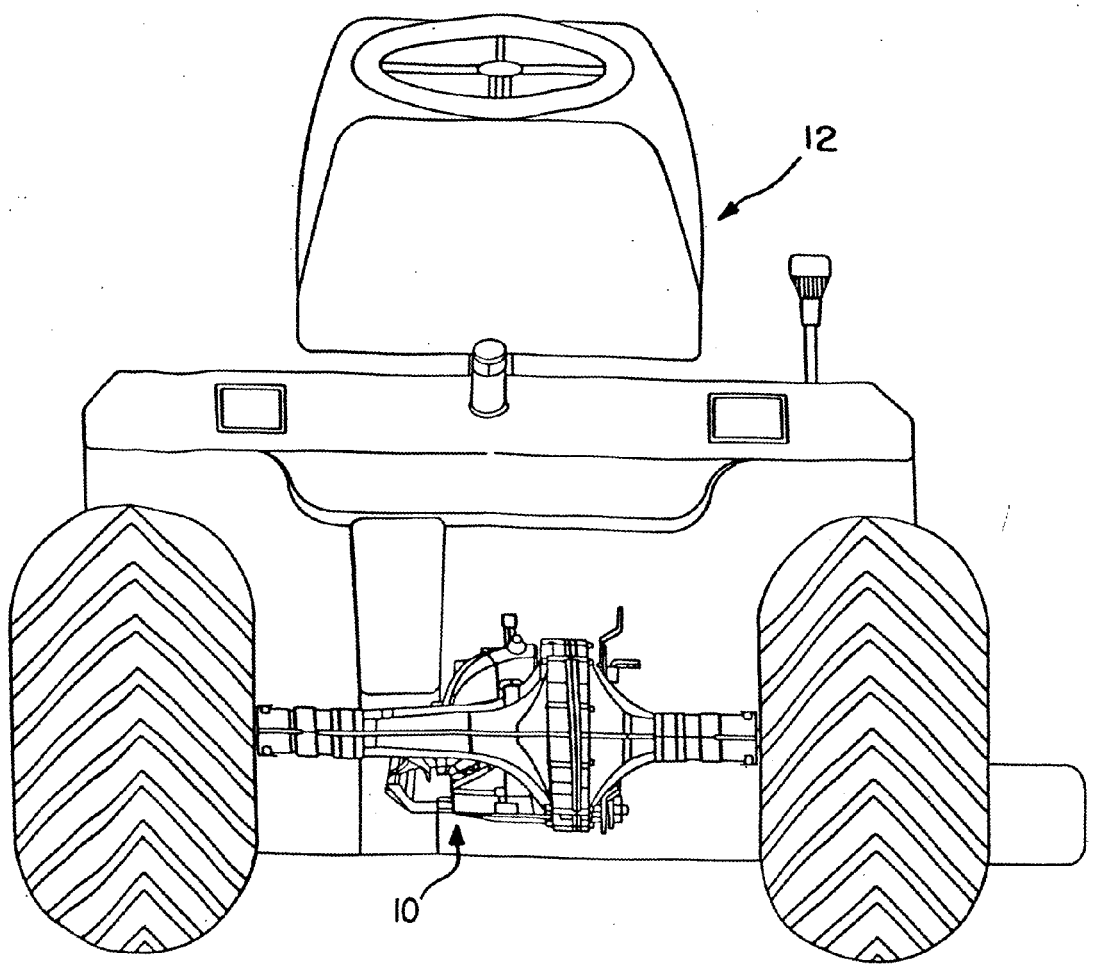
Figure 2:
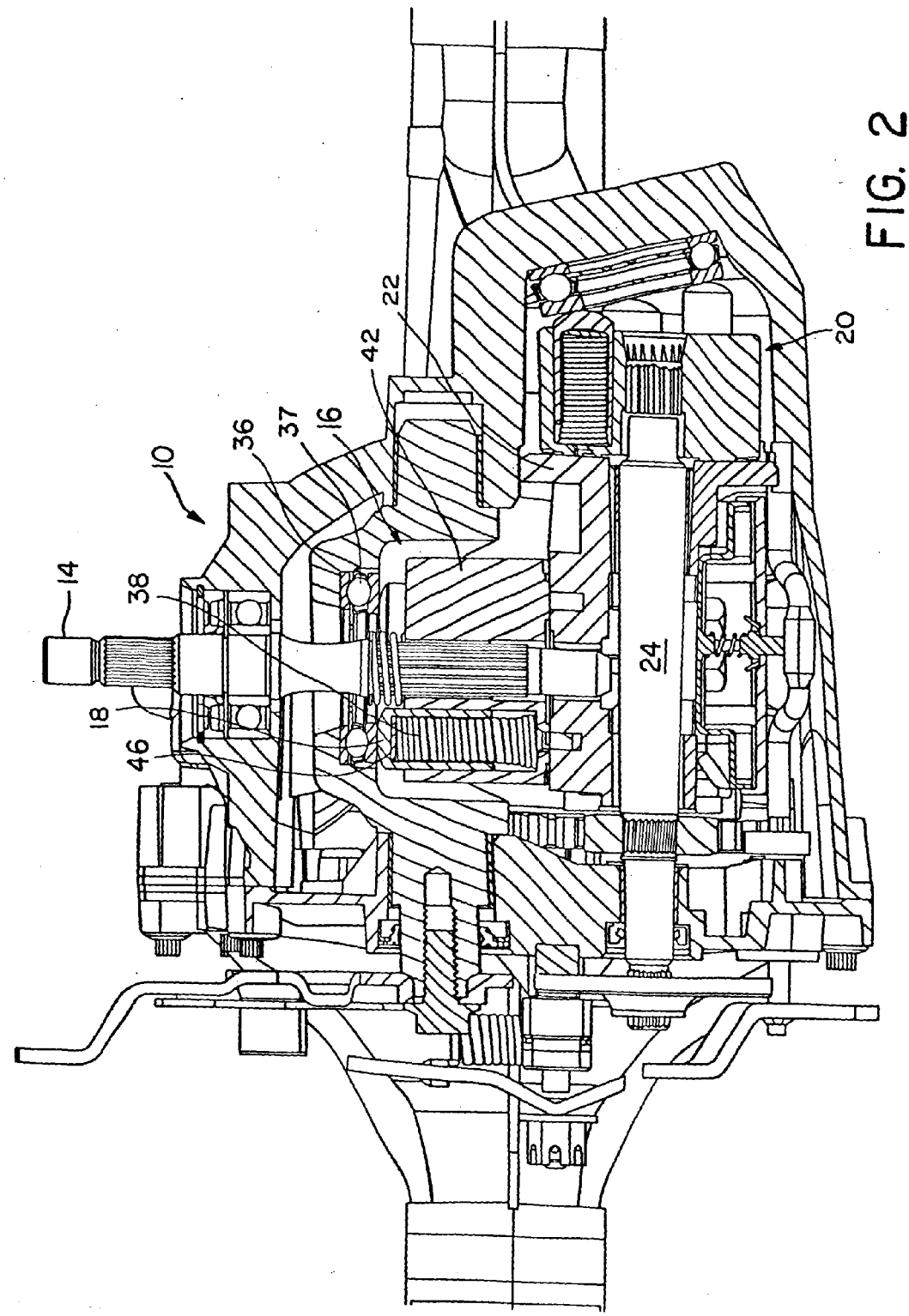
Figure 3:
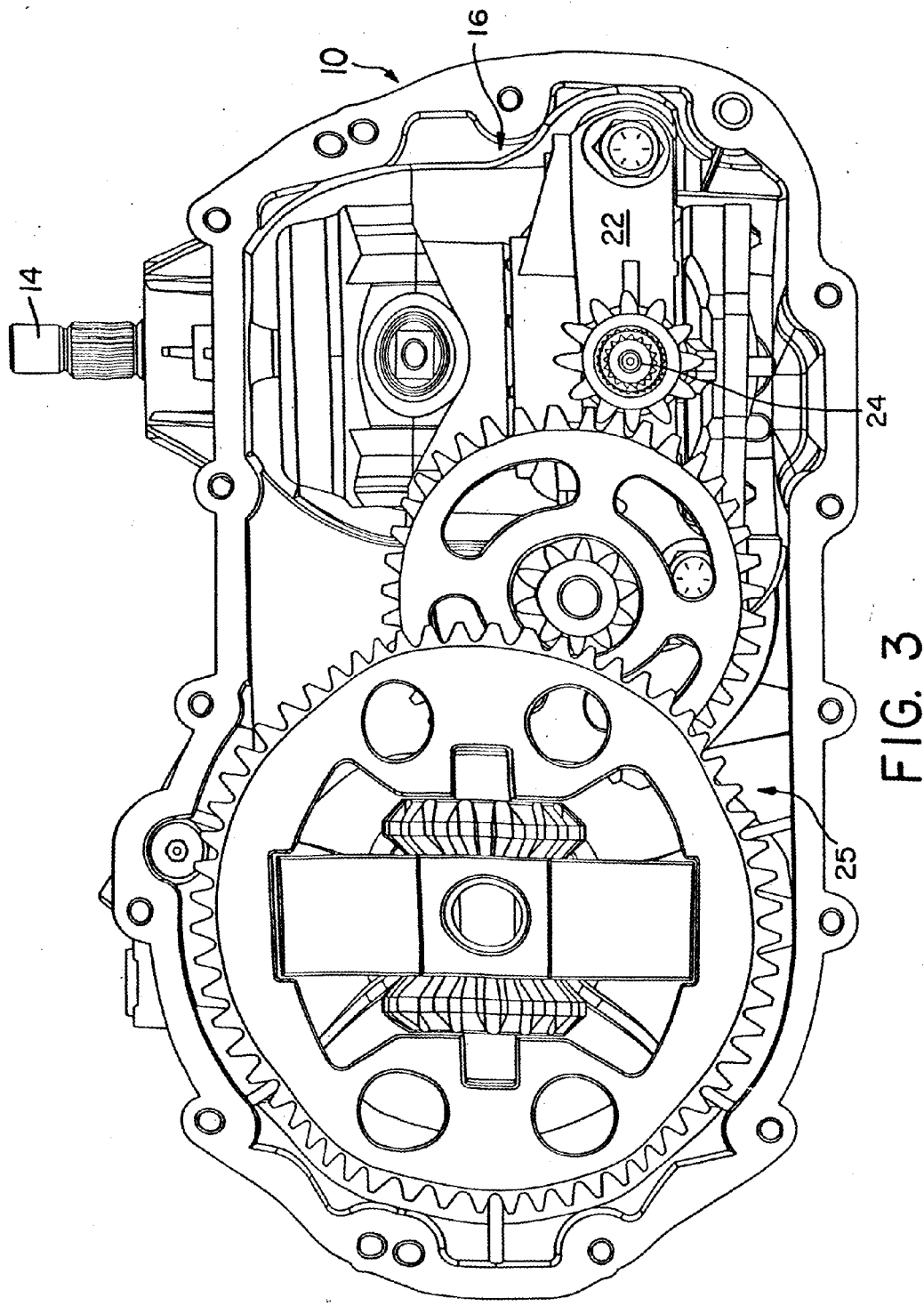
Figure 4:
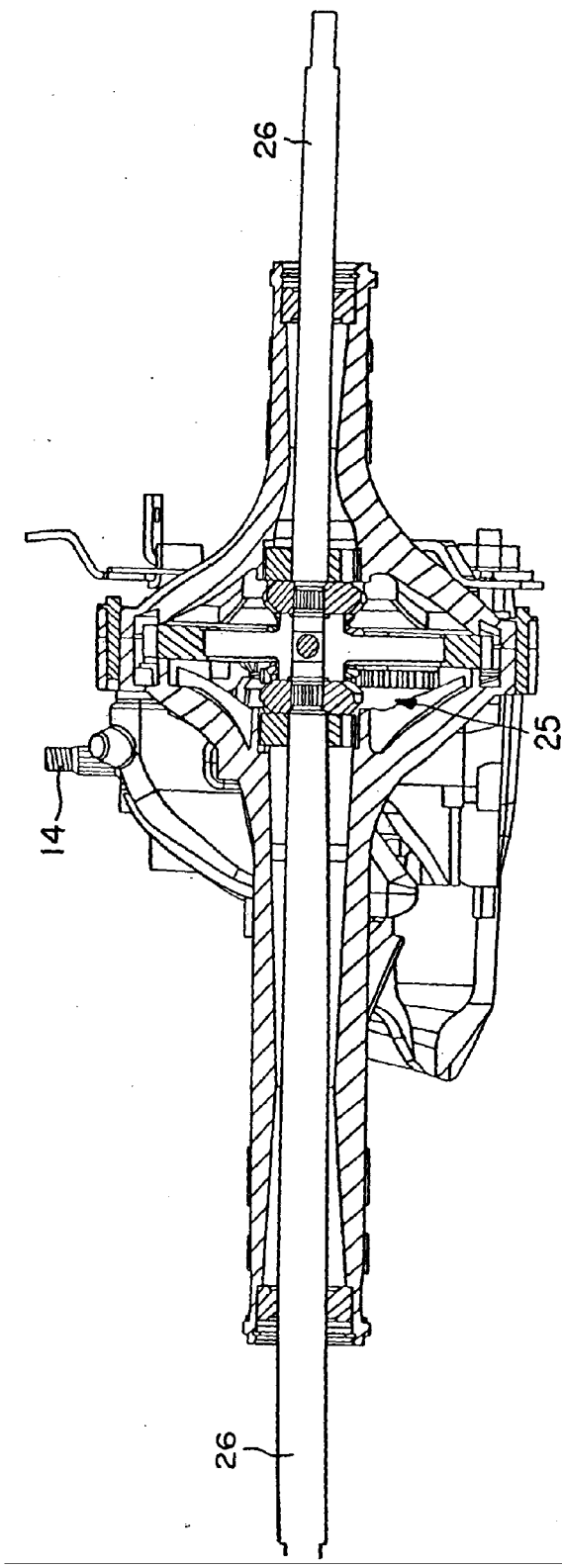
Figure 5:
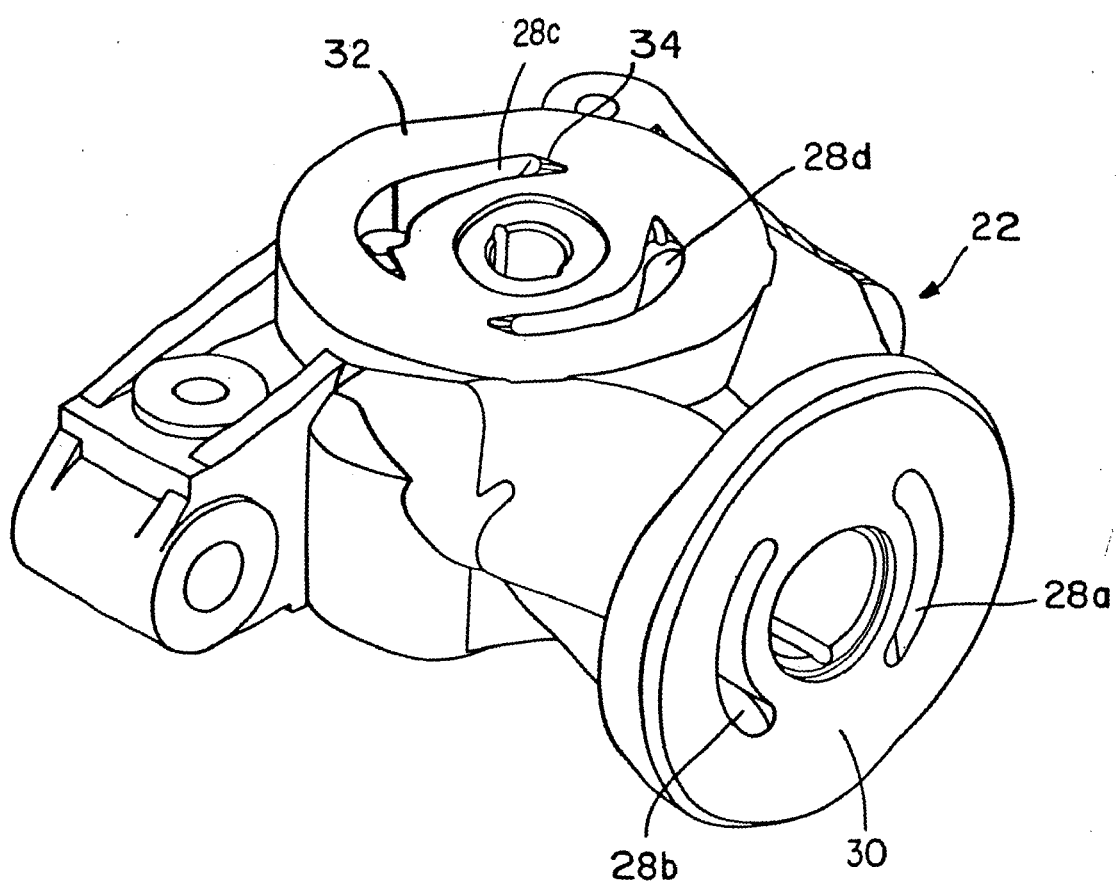
Figure 6:
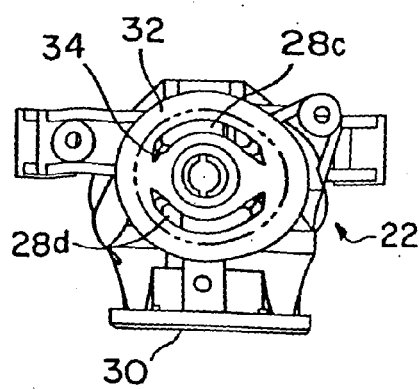
Figure 8:
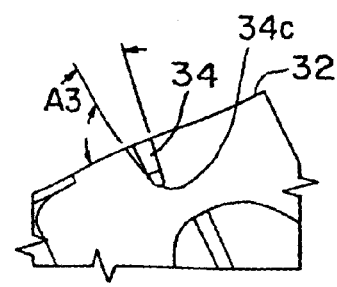
Figure 7:
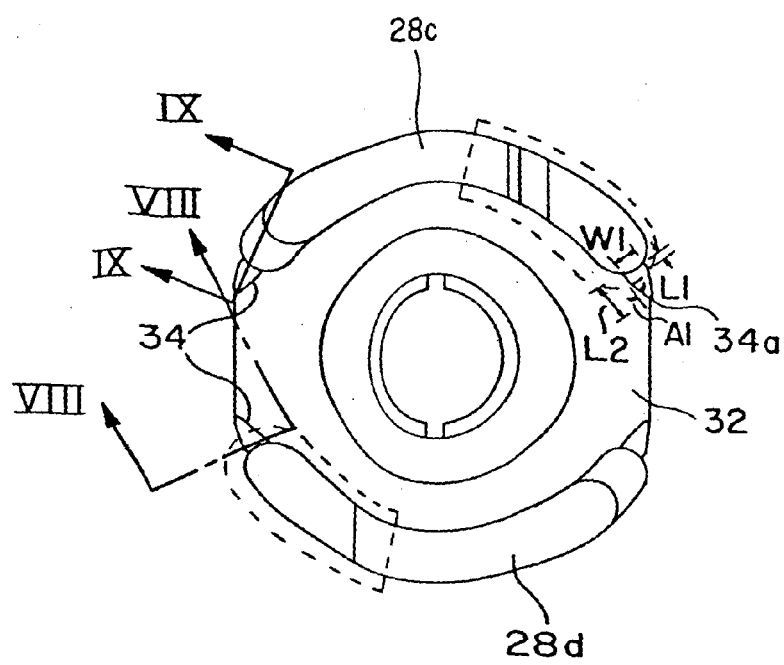
Figure 9:
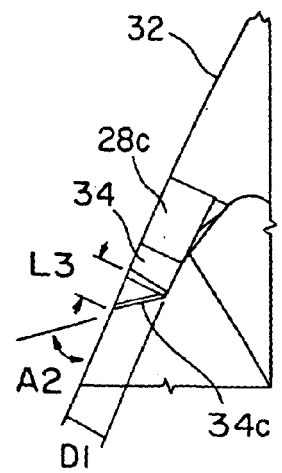
Figure 11:
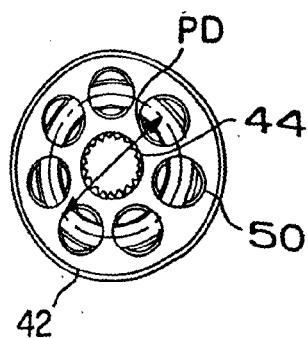
Figure 10:
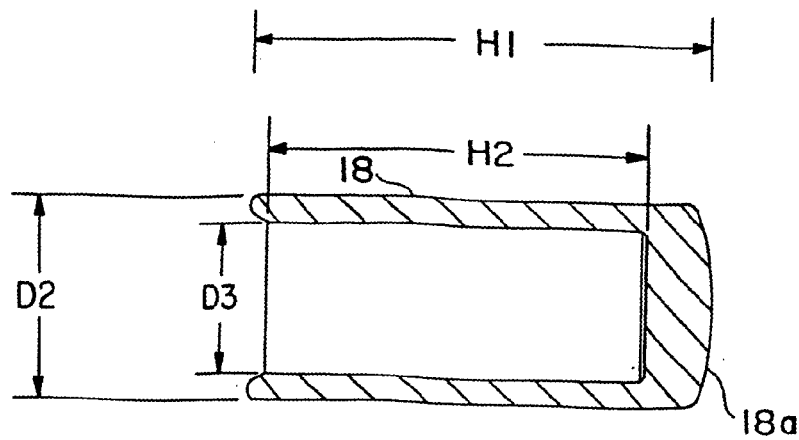
Figure 13:
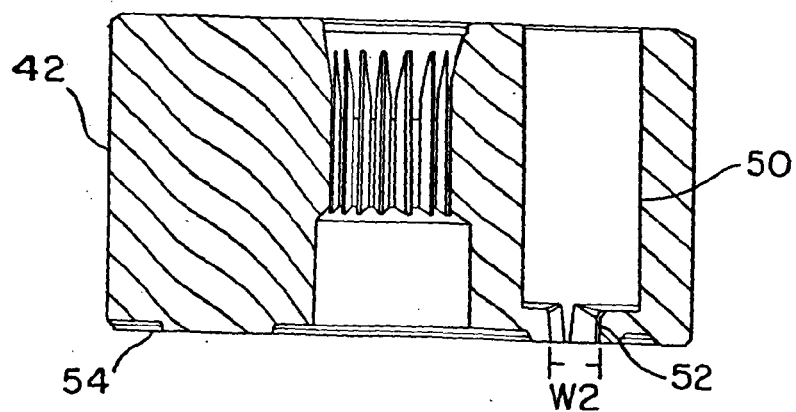
Figure 12:
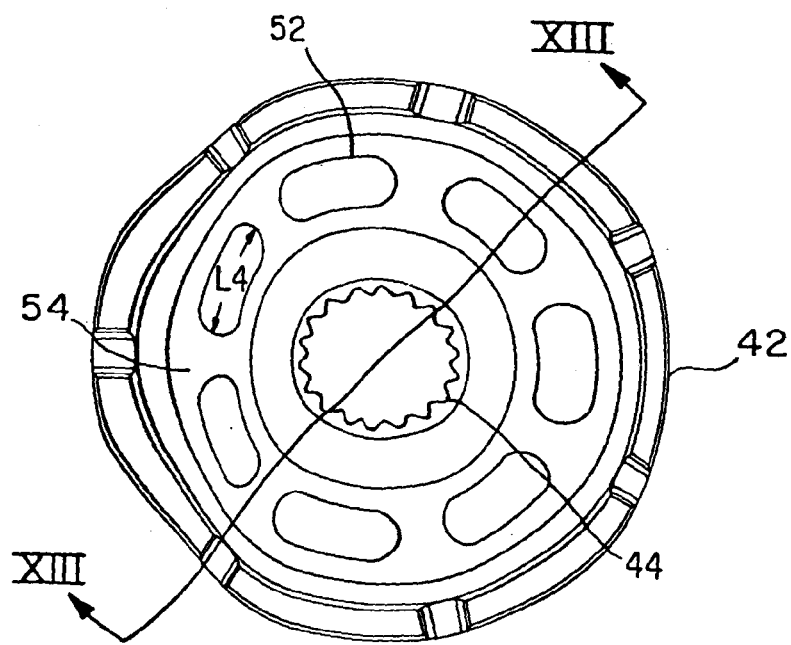

More specifically, as illustrated in FIGS. 11–13, the seven pump pistons 18 are generally equidistantly carried in a pump cylinder block 42 which includes a splined center aperture 44 which is adapted to mate with cooperating splines on the input shaft 14. In the illustrated embodiment, the pitch diameter PD of the hydraulic pump cylinder block 42 is approximately 1.52 inches and the cylinder bores 50 in which the pump pistons 18 are carried have a diameter that is approximately the same as the outside diameter of the pump pistons 18 with sufficient clearance to allow the pump pistons to reciprocate within the cylinder bore. Kidney or arcuate shaped port openings 52 leading to the cylinder bores 50 are provided on the running surface 54 of the pump cylinder block 42. The port openings 52 have a width W2 that is generally equal to the width provided to the kidney shaped port openings 28c/28d and have an arc-length L4 that is generally equal to the diameter of the cylinder bore 50. It will be appreciated that the dimensions provided to the grooves 34 and port openings 28c/28d on the pump running surface 32 of the center section 22 are especially adapted for a pump cylinder block 42 having the dimensions above-noted.

To ensure that the pump pistons 18 are driven by the thrust bearing 37 of the swash plate 36 to the correct depth within the pump cylinder block 42 when traveling over the port openings 28c/28d to thereby ensure the desired flow of hydraulic fluid within the hydraulic circuit, each of the seven pump pistons 18 is provided with a nose portion 18a the configuration of which is dependent upon the external diameter D2 of the pump piston cylinder 18 as well as the pitch diameter of the hydraulic pump cylinder block 42. In the present case, where the external diameter D2 of the pump piston 18 is approximately 0.53 inches and the pitch diameter is approximately 1.52 inches, the nose portion 18a of the pump piston 18 is provided with a generally rounded shape having a spherical radius of approximately 0.82 inches. The edge radius where the nose portion 18a transitions to the sides of the pump piston 18 is provided with maximum transition radius of 0.050 inches. In this manner, it is ensured that the swash plate will stay on the nose portion 18a of the pump piston 18 throughout its range of motion. The approximate height H1 of the pump piston 18 is approximately 1.20 inches.

Figure 10:
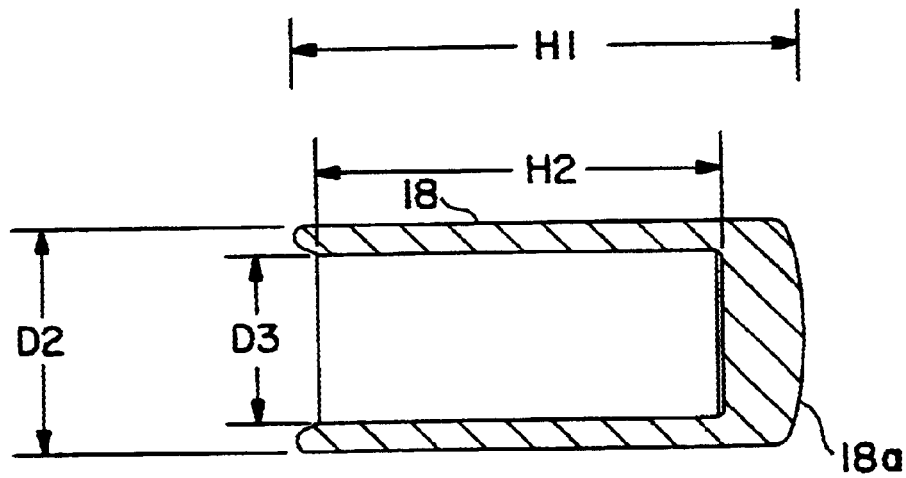
FIG. 10 illustrates a cross-sectional view of an exemplary pump piston of the transmission illustrated in FIG. 1.

For holding the spring assembly, a chamber is defined within the pump piston 18 having an internal diameter D3 of approximately 0.39 inches and a depth H2 of approximately 1.0 inches as seen in FIG. 10. The internal diameter D3 is generally constant throughout the depth H2 although the opening to the interior of the pump piston 18a may be chamfered and, therefore, slightly larger. It is to be understood that the depth H2 of the pump piston is selected to ensure that: 1) the nose portion 18a of the pump piston 18 is sufficiently strong to withstand forces as the pump piston 18 interacts with the thrust bearing 37 of the swash plate 36; and 2) the spring rate is sufficient to restore the pump piston 18 to an extended position against the thrust bearing 37 of the swash plate 36. In this regard, the swash plate 36 has a rotational range of motion of plus/minus 16 degrees.

While specific embodiments of the invention have been described in detail, it will be appreciated by those skilled in the art that various modifications and alternatives to those details could be developed in light of the overall teachings of the disclosure. Furthermore, it will be understood that the disclosed dimensions are only approximate and slight variations resulting from imprecision in machining processes are tolerated. For example, on mechanical drawings depicting the center section pump running surface, a tolerance of plus/minus one degree is specified for angular dimensions. Similarly, for those dimensions expressed to the tenth, a tolerance of plus/minus 0.02 is specified, for those dimensions expressed to the hundredth, a tolerance of plus/minus 0.01 is specified, and for those dimensions expressed to the thousandth, a tolerance of plus/minus 0.005 is specified. Accordingly, the particular arrangement disclosed is meant to be illustrative only and not limiting as to the scope of the invention which is to be given the full breadth of the appended claims and any equivalents thereof.

What is claimed is:

1. A hydrostatic transmission, comprising:
   a hydraulic pump and a hydraulic motor; and
   a center section having a pump running surface on which the hydraulic pump rotates and a motor running surface on which the hydraulic motor rotates, the center section having porting by which the hydraulic pump and the hydraulic motor are in fluid communication;
   wherein the porting terminates in a pair of equidistantly spaced, generally arcuate shaped openings on the pump running surface, the pump running surface includes a plurality of generally v-shaped grooves extending from each of the ends of the generally arcuate shaped openings, and each of the grooves has an arc-length that is approximately 18 percent of the arc-length of the average distance between the ends of the generally arcuate shaped openings.

2. The hydrostatic transmission as recited in claim 1, wherein the hydraulic pump comprises a pump cylinder block having seven pump cylinder bores in which seven pump pistons are carried and wherein each of the grooves has an arc length that is approximately 31 percent of the average diameter of at least one of the pump cylinder bores.

3. The hydrostatic transmission as recited in claim 2, wherein each of the grooves has side walls that taper inwardly and terminate at a generally arcuate shaped bottom.

4. The hydrostatic transmission as recited in claim 3, wherein the side walls form an arcuate angle of approximately 20 degrees.

5. The hydrostatic transmission as recited in claim 3, wherein the bottom has a first portion adjacent to the end of the arcuate opening that is generally parallel to the pump running surface and a second portion that is angled and which extends from the first portion to the pump running surface.

6. The hydrostatic transmission as recited in claim 5, wherein the second portion of the bottom has an angle of approximately 55 degrees.

7. The hydrostatic transmission as recited in claim 3, wherein the side walls of each of the grooves has a tapered portion along their length which tapers at an angle of approximately 14 degrees to provide the groove with the general V-shape.

8. The hydrostatic transmission as recited in claim 7, wherein the side walls of each of the grooves has a straight portion along their length between the tapered portion and the end of the arcuate opening.

9. The hydrostatic transmission as recited in claim 1, wherein the hydraulic pump comprises a pump cylinder block having seven pump cylinder bores in which seven pump pistons are carried and wherein each of the grooves has an arc length that is approximately 31 percent of the average diameter of at least one of the pump cylinder bores.

10. A hydraulic transmission comprising:
    a hydraulic pump and a hydraulic motor; and
    a center section having a pump running surface on which the hydraulic pump rotates and a motor running surface on which the hydraulic motor rotates, the center section having porting by which the hydraulic pump and the hydraulic motor are in fluid communication wherein the porting terminates in a pair of equidistantly spaced, generally arcuate shaped openings and the pump running surface includes a plurality of generally v-shaped grooves extending from each of the ends of the generally arcuate shaped openings; and
    wherein each of the grooves has side walls that taper inwardly and terminate at a generally arcuate shaped bottom, the bottom has a first portion adjacent to the ends of the arcuate openings that is generally parallel to the pump running surface and a second portion that is angled and which extends from the first portion to the pump running surface, and the side walls each have a straight portion along their length between a tapered portion which provides the groove with the general v-shape and the end of the arcuate opening.

11. A hydrostatic pump comprising:
    a running surface;
    a pump cylinder block in which piston are carried, the cylinder block mounted on the running surface;
    a pair of arcuate ports formed in the running surface;
    at least one groove extending from an end of each arcuate port, wherein each groove has a bottom at a constant depth generally parallel to the running surface and an angled portion connecting the bottom of the groove to the running surface.

12. The hydrostatic pump of claim 11, wherein the pump cylinder block comprises seven pistons.

13. The hydrostatic pump of claim 12, wherein the arc described by each of the arcuate ports is approximately 130 degrees.

14. The hydrostatic pump of claim 13, wherein the angular arc length of each of the grooves is approximately 12.3 degrees.

15. The hydrostatic pump of claim 14, wherein the angular arc length of each of the grooves is approximately 0.163 inches in length.

16. The hydrostatic pump of claim 11, wherein the bottom of the groove is at an approximatel depth of 0.18 inches from the running surface.

17. The hydrostatic pump of claim 16, wherein the width of each groove adjacent to an arcuate port is approximately 0.09 inches.

18. The hydrostatic pump of claim 11, wherein the bottom of each groove extends a length of approximately 0.016 inches.

19. The hydrostatic pump of claim 11, wherein the angled portion is at approximately 55 degrees as measured from the running surface to an imaginary extension of the angled surface above the running surface.

20. The hydrostatic pump of claim 11, wherein the pitch diameter of the cylinder block and arcuate ports is approximately 1.52 inches.

21. The hydrostatic pump of claim 20, wherein the pump cylinder block comprises seven pistons.

22. The hydrostatic pump of claim 21, wherein the length of each of the grooves extending from an arcuate port is 0.163 inches in length.

23. The hydrostatic pump of claim 11, wherein the bottom of the groove and the angled portion of the groove have a radius along the lowest portion of the groove.

24. The hydrostatic pump of claim 23, wherein the radius is approximately 0.016 inches.

25. The hydrostatic pump of claim 11, wherein the depth of at least one groove adjacent to an arcuate port is approximately the same depth as the arcuate port.

26. The hydrostatic pump of claim 11, wherein the sides of the groove are tapered from the bottom of the groove.

27. The hydrostatic pump of claim 26, wherein the full angle of the taper is approximately 20 degrees.

28. The hydrostatic pump of claim 11, wherein the portion of each groove adjacent to an arcuate port has a width less than the width of the arcuate port.

29. The hydrostatic pump of claim 28, wherein the width of the groove is approximately 0.09 inches.

30. A hydraulic pump apparatus comprising:

a running surface connected to hydraulic porting and a pump cylinder block mounted on the running surface and hydraulically connected to the porting;

wherein the prting terminates in a pair of equidistantly spaced, generally arcuate shaped openings and the pump running surface includes a plurality of generally v-shaped grooves extending from each of the ends of the generally arcuate shaped openings; and wherein each of the grooves has side walls that taper inwardly and terminate at a generally arcuate shaped bottom, the bottom has a first portion adjacent to the ends of the arcuate openings that is generally parallel to the pump running surface and a second portion that is angled and which extends from the first portion to the pump running surface, and the side walls each have a straight portion along their length between a tapered portion which provides the groove with the general v-shape and the end of the arcuate opening.

* * * * *

UNITED STATES PATENT AND TRADEMARK OFFICE
CERTIFICATE OF CORRECTION

PATENT NO. : 6,675,696 B1
DATED : January 13, 2004
INVENTOR(S) : Langenfeld

It is certified that error appears in the above-identified patent and that said Letters Patent is hereby corrected as shown below:

Please replace drawings with attached drawings.

Signed and Sealed this

Twenty-fourth Day of August, 2004

JON W. DUDAS
*Director of the United States Patent and Trademark Office*